3,409,558
METHOD OF PREPARING A SLURRY
COATING COMPOSITION
Irwin Kachel, Skokie, Ill., assignor to The Rauland Corporation, Chicago, Ill., a corporation of Illinois
No Drawing. Filed June 30, 1965, Ser. No. 468,590
5 Claims. (Cl. 252—301.3)

ABSTRACT OF THE DISCLOSURE

In the preparation of a slurry coating composition a quantity of phosphor is first impregnated with a sensitizing agent such as ammonium dichromate. This is accomplished by soaking the phosphor in a solution of the sensitizer after which the impregnated phosphor is dried and ball-milled with normal amounts of resinous binder and a solvent. After ball-milling, additional quantities of sensitizer and binder are added to achieve the desired viscosity.

---

The present invention is directed to a method of preparing a sensitized slurry coating composition for use in screening the image area of a color cathode-ray tube.

The slurry screening of a color cathode-ray tube is now well known in the art and is in commercial practice. It involves covering the whole image area of the tube with a slurry coating composition which comprises phosphor particles suspended in a resinous solution which has been sensitized to the end that its solubility in a particular solvent is a function of its exposure to actinic light. The screen or image area with such a slurry coating is exposed in a chamber or lighthouse to actinic energy by projecting that energy onto the coating through the parallax barrier or shadow mask or the tube. As a consequence, certain elemental areas of the coating are exposed but others are not. If the coating is of the negative acting type, and this is most common, the exposed areas are rendered insoluble whereas the unexposed areas retain their solubility in the solvent of the coating composition. Accordingly, washing the image area with the solvent develops the image resulting from exposure of the screen through the parallax mask. If the mask has a pattern of circular apertures, the developed image is a corresponding multiplicity of phosphor dots of a particular color. This same general process is carried out three times, once for each of the three primary phosphor colors. The final screen pattern is the now familiar field of dot triads with the three dots of each triad representing phosphor of the three primary colors.

Positive acting photosensitive resists are also known and may be employed in essentially the same way as the negative acting type although the influence of actinic light on positive resists is to render the exposed areas soluble while the unexposed areas are insoluble.

It is an object of the present invention to improve the process of preparing the slurry composition for use in screening a color tube.

It is a specific object of the invention to provide a method of slurry preparation which improves the density of the phosphor dots.

It is another specific object of the invention to provide a process of slurry preparation which enhances the adherence, density and light sensitivity of the phosphor dots.

The method of the invention for preparing a sensitized slurry coating composition for screening the image area of a color cathode-ray tube comprises impregnating a quantity of phosphor particles with the sensitizing agent of the coating composition. The impregnated phosphor particles are then ball-milled in a solution of a resinous binder and a solvent for that binder. Thereafter, additional quantities of the sensitizer may be added to the ball-milled composition to form a sensitized slurry to which there may also be added further quantities of the binder solution to achieve a desired viscosity.

Preferably, a water soluble binder is used and the sensitizing agent, which must be compatible with both the binder and its solvent, may be a diazo product or a dichromate of potassium, sodium or ammonia. The phosphor particles are soaked in a water solution of the sensitizer to adsorb the sensitizing agent.

The features of the present invention which are believed to be novel are set forth with particularity in the appended claims. The invention together with further objects and advantages thereof may best be understood by reference to the following description.

As indicated, the subject invention concerns the method of preparing a sensitized slurry coating composition and as used herein that expression is intended to define a composition including a resinous binder which has the property that its solubility in a particular solvent is proportional to, or may be changed under the influence of, actinic energy. Resinous binders such as polyvinyl alcohol exhibit this property when treated with a sensitizing agent and such a sensitized binder may serve as a vehicle for suspending phosphor particles used in slurry screening the image area of a color cathode-ray tube.

The initial step in the preparation of the slurry coating composition is the impregnating of a quantity of phosphor particles with the sensitizing agent to be employed as an ingredient in the coating composition. This is readily accomplished by soaking the phosphor particles in a solution of the sensitizer so that the sensitizer is adsorbed on the surface of the phosphor particles. A suitable formulation is as follows:

775 grams of phosphor particles,
5.65 grams of ammonium dichromate,
300 cc. of water.

The illustrative formulation is typical of that used in screening a 21 inch round color television tube. It includes a desirable quantity of phosphor and approximately 75 percent of the amount of ammonium dichromate sensitizer normally used in making a slurry of that amount of phosphor. Adsorbtion is attained by soaking in a mixer wherein the batch is preferably continuously agitated for 15 to 24 hours or even longer, if desired. After that time the excess water is evaporated out and the phosphor is dried by heat.

The dried phosphor, which now will have been saturated with the sensitizing agent, is ball-milled with the normal amounts of resinous binder and its solvent. It is convenient to employ a water soluble binder such as polyvinyl alcohol and a typical formulation of the charge for the ball-mill is as follows:

280.65 grams of the mixed phosphor and ammonium dichromate,
167 grams of 10% solution of polyvinyl alcohol in water,
97 cc. of water.

This mix is ball-milled for approximately 12 hours and thereafter there is added the remaining percentage of the sensitizing agent and an aditional quantity of the resinous binder solution. For example, the following would be added to the foregoing illustrative formulation:

380 cc. of water,
18.7 cc. of 10% solution of ammonium dichromate in water,
265 cc. of 10% solution of polyvinyl alcohol in water.

The entire amount of sensitizer may, if desired, be included in the material with which the ball mill is charged in which case it is not necessary to add any after the milling step.

The resulting slurry coating composition is especially beneficial for screening the image area of a color cathode-ray tube by the process described above. It is found that the described slurry preparation process causes the phosphor particles to become physically saturated with the sensitizing agent which improves the adherence of the slurry to the glass substrate constituting the image area of the tube. Because of the better adherence there is increased phosphor density of the dots with attendant advantages in reduction of cross contamination and better brightness. It also appears that there may be a reduction in the exposure time required to develop the phosphor images.

In prior practices, the entire amount of ammonium dichromate or sensitizing agent is added after the ball-milling step whereas the present invention contemplates that at least a predetermined portion, approximately 75 percent in the illustrative example, of the total amount of sensitizing agent desired is applied to the phosphor prior to ball-milling so that the sensitizing agent is adsorbed on the phosphor surface before the resinous binder may be adsorbed. The previous practice of adding the sensitizing agent subsequent to ball-milling the phosphor in the resinous binder solution results in a shield of the binder around the phosphor which the sensitizing agent finds difficult to penetrate. The adsorbtion of the sensitizing agent resulting from the described process avoids this difficulty and improves the slurry coating composition in respect of adherence and phosphor density.

Another improved process of slurry preparation, featuring including the sensitizing agent in the charge of the ball-mill rather than separately coating the phosphor particles before adding them to the ball-mill, is the subject of a concurrently filed application of Burt Benson, Serial No. 468,628, assigned to the assignee of the present invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fell within the true spirit and scope of the invention.

I claim:

1. The method of preparing a sensitized slurry coating composition for screening the image area of a color cathode-ray tube which comprises:
   impregnating a quantity of phosphor particles with the sensitizer of said composition;
   and ball-milling said impregnated phosphor particles in a solution comprising a resinous binder and a solvent for said binder to form a sensitized slurry composition.

2. The method of preparing a sensitized slurry coating composition for screening the image area of a color cathode-ray tube which comprises:
   soaking a quantity of phosphor particles in a solution of the sensitizer of said composition to saturate said particles with said sensitizer;
   drying said saturated phosphor particles;
   ball-milling said dried and saturated phosphor particles in a solution comprising a resinous binder and a solvent for said binder to form a sensitized slurry composition.

3. The method of preparing a slurry coating composition, containing a given amount of a sensitizer, for screening the image area of a color cathode-ray tube which comprises:
   soaking a quantity of phosphor particles in a solution formed of a predetermined percent of said amount of the sensitizer of said composition to saturate said particles with said sensitizer;
   drying said saturated phosphor particles;
   ball-milling said dried and saturated phosphor particles in a solution comprising a resinous binder and a solvent for said binder;
   and adding the remainder of said amount of said sensitizer to said solution after ball-milling to form a sensitized slurry composition.

4. The method of preparing a slurry coating composition, containing a given amount of a sensitizer, for screening the image area of a color cathode-ray tube which comprises:
   soaking a quantity of phosphor particles in an aqueous solution formed of a predetermined percent of said amount of the sensitizer of said composition to saturate said particles with said sensitizer;
   drying said saturated phosphor particles;
   ball-milling said dried and saturated phosphor particles in an aqueous solution of a water-soluble resinous binder;
   and adding the remainder of said amount of said sensitizer to said solution after ball-milling to form a sensitized slurry composition.

5. The method of preparing a slurry coating composition, containing a given amount of ammonium dichromate, for screening the image area of a color cathode-ray tube which comprises:
   soaking a quantity of phosphor particles in an equeous solution formed of a predetermined percent of said amount of ammonium dichromate to saturate said particles with said sensitizer;
   drying said saturated phosphor particles;
   ball-milling said dried and saturated phosphor particles in an aqueous solution of polyvinyl alcohol;
   and adding the remainder of said amount of ammonium dichromate to said solution after ball-milling to form a sensitized slurry composition.

References Cited

UNITED STATES PATENTS 3,097,103   7/1963   Homer et al. _____ 252—301.3

TOBIAS E. LEVOW, *Primary Examiner.*

ROBERT D. EDMONDS, *Assistant Examiner.*